(12) United States Patent
Elliston et al.

(10) Patent No.: US 9,375,796 B2
(45) Date of Patent: Jun. 28, 2016

(54) SAW BLADE WITH ROBUST TOOTH FORM (75) Inventors: Asif Elliston, Springfield, MA (US);
Stephen A. Hampton, East Longmeadow, MA (US); William B. Korb, Broad Brook, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 934 days.

(21) Appl. No.: 12/776,145

(22) Filed: May 7, 2010

(65) Prior Publication Data
US 2011/0271815 A1 Nov. 10, 2011

(51) Int. Cl.
*B23D 61/12* (2006.01)

(52) U.S. Cl.
CPC ........... *B23D 61/121* (2013.01); *Y10T 83/9319* (2015.04); *Y10T 83/9454* (2015.04)

(58) Field of Classification Search
CPC ........ B23D 6/025; B23B 33/02; B23B 33/04; B23B 33/06; B23B 33/08; B23B 33/12; B23B 2251/14; Y10T 83/9454; Y10T 83/9319
USPC ............ 83/848, 843, 846, 847, 835, 661, 851
See application file for complete search history.

(56) References Cited

U.S. PATENT DOCUMENTS

| | | | |
|---|---|---|---|
| 603,128 A | 4/1898 | Clemson |
| 820,969 A | 5/1906 | Grelck |
| 1,181,529 A | 5/1916 | Hutton |
| 1,381,478 A | 6/1921 | Lawrence |
| 1,381,930 A | 6/1921 | Morgan |
| 2,126,382 A | 8/1938 | Goff et al. |
| 2,227,864 A | 1/1941 | Ronan |
| 2,241,703 A | 5/1941 | Gommel |
| 2,394,035 A | 2/1946 | Blum |
| 2,534,424 A | 12/1950 | Dryden |
| 2,568,870 A | 9/1951 | Ronan |
| 2,635,327 A | 4/1953 | Enlow |
| 2,637,355 A | 5/1953 | Chapin |

(Continued)

FOREIGN PATENT DOCUMENTS

| | | |
|---|---|---|
| CH | 691438 A5 | 7/2001 |
| DE | 19501019 B4 | 11/2005 |

(Continued)

OTHER PUBLICATIONS

International Search Report & Written Opinion of the International Searching Authority for International Application No. PCT/US11/35660, mailed Aug. 9, 2011.

*Primary Examiner* — Stephen Choi
*Assistant Examiner* — Fernando Ayala
(74) *Attorney, Agent, or Firm* — Sutherland Asbill & Brennan LLP (57) ABSTRACT

A recip saw blade has a blade body and a cutting edge extending along the blade body and defined by a repeating pattern of two consecutive teeth. Each of the two consecutive teeth includes a primary clearance surface defining a relatively steep primary clearance angle, a secondary clearance surface defining a relatively shallow secondary clearance angle, a tip, a rake face located on the opposite side of the tip relative to the primary clearance surface, a gullet defining a depth, a first gullet radius located on an opposite side of the gullet relative to the rake face, and a second gullet radius located between the gullet and the rake face, wherein the depth of the gullet is greater than the second gullet radius.

42 Claims, 9 Drawing Sheets

(56) References Cited

U.S. PATENT DOCUMENTS

| | | | |
|---|---|---|---|
| 2,682,098 A | 6/1954 | Wilcox | |
| 2,987,086 A | 6/1961 | Westlund, Jr. | |
| 3,028,889 A | 4/1962 | McCarty | |
| 3,033,251 A | 5/1962 | Atkinson et al. | |
| 3,111,970 A | 11/1963 | Priest et al. | |
| 3,171,457 A | 3/1965 | Brown | |
| 3,292,674 A | 12/1966 | Turner | |
| 3,309,756 A | 3/1967 | Segal | |
| 3,314,456 A | 4/1967 | Craven | |
| 3,357,462 A | 12/1967 | Craven | |
| 3,576,061 A | 4/1971 | Pahlitzsch | |
| 3,576,200 A | 4/1971 | Elmes | |
| 4,179,967 A | 12/1979 | Clark | |
| 4,232,578 A | 11/1980 | Stellinger et al. | |
| 4,292,871 A | 10/1981 | Neumeyer et al. | |
| RE31,433 E | 11/1983 | Clark | |
| 4,557,172 A * | 12/1985 | Yoneda | 83/848 |
| 4,688,458 A | 8/1987 | Krilov | |
| 4,727,788 A | 3/1988 | Yoshida et al. | |
| 4,784,033 A | 11/1988 | Hayden et al. | |
| 4,784,034 A | 11/1988 | Stones et al. | |
| 4,798,001 A | 1/1989 | Grossmann et al. | |
| 4,802,396 A | 2/1989 | Kuklinski | |
| 4,813,324 A | 3/1989 | Yoshida et al. | |
| 4,827,822 A | 5/1989 | Yoshida et al. | |
| 4,913,022 A | 4/1990 | Kuklinski | |
| 4,958,546 A | 9/1990 | Yoshida et al. | |
| 5,018,421 A | 5/1991 | Lucki et al. | |
| 5,094,135 A | 3/1992 | Nakahara et al. | |
| 5,331,876 A | 7/1994 | Hayden, Sr. | |
| 5,340,129 A | 8/1994 | Wright | |
| 5,410,935 A | 5/1995 | Holston et al. | |
| 5,425,296 A | 6/1995 | Kullmann et al. | |
| 5,433,457 A | 7/1995 | Wright | |
| 5,477,763 A | 12/1995 | Kullman | |
| 5,501,129 A * | 3/1996 | Armstrong et al. | 83/848 |
| 5,603,252 A | 2/1997 | Hayden, Sr. | |
| 5,606,900 A | 3/1997 | Stoddard | |
| 5,697,280 A * | 12/1997 | Armstrong et al. | 83/848 |
| 5,832,803 A | 11/1998 | Hayden, Sr. | |
| 5,848,473 A | 12/1998 | Brandenburg | |
| 5,868,058 A | 2/1999 | Senegas | |
| 6,003,422 A | 12/1999 | Holston | |
| 6,119,571 A | 9/2000 | Hayden | |
| 6,145,426 A | 11/2000 | Ward et al. | |
| 6,158,324 A * | 12/2000 | Kullmann et al. | 83/848 |
| 6,167,712 B1 * | 1/2001 | Lim et al. | 62/113 |
| 6,167,792 B1 * | 1/2001 | Korb et al. | 83/835 |
| 6,178,646 B1 | 1/2001 | Schnell et al. | |
| D438,549 S | 3/2001 | Tsujimoto | |
| 6,220,139 B1 | 4/2001 | Kobayashi et al. | |
| 6,220,140 B1 | 4/2001 | Hellebergh | |
| 6,230,411 B1 | 5/2001 | Wall et al. | |
| 6,244,152 B1 | 6/2001 | Di Nicolantonio | |
| 6,257,226 B1 | 7/2001 | Hayden | |
| 6,269,722 B1 | 8/2001 | Hellbergh | |
| 6,276,248 B1 | 8/2001 | Cranna | |
| 6,276,249 B1 | 8/2001 | Handschuh et al. | |
| 6,357,122 B2 | 3/2002 | Bachta | |
| 6,357,124 B1 | 3/2002 | Wall et al. | |
| 6,363,827 B1 | 4/2002 | Osing et al. | |
| 6,439,094 B1 | 8/2002 | Yoneda et al. | |
| 6,520,722 B2 | 2/2003 | Hopper et al. | |
| 6,532,852 B1 | 3/2003 | Tsujimoto et al. | |
| 6,598,509 B2 | 7/2003 | Cook et al. | |
| 6,601,495 B2 * | 8/2003 | Cranna | 83/848 |
| D482,945 S | 12/2003 | Grolimund | |
| 6,834,573 B1 | 12/2004 | Nakahara | |
| 6,883,412 B1 * | 4/2005 | Turfitt | B23D 61/04 83/835 |
| 7,036,415 B2 | 5/2006 | Tsujimoto | |
| 7,036,417 B2 | 5/2006 | Alton | |
| 7,127,979 B2 | 10/2006 | Kocher et al. | |
| 7,131,365 B2 | 11/2006 | Hall et al. | |
| D534,401 S | 1/2007 | Duffin et al. | |
| 7,174,823 B2 | 2/2007 | Cranna | |
| 7,225,714 B2 * | 6/2007 | Rompel et al. | 83/835 |
| 7,225,715 B2 * | 6/2007 | Lowder et al. | 83/848 |
| 7,568,416 B2 | 8/2009 | Tsujimoto | |
| 7,600,458 B2 | 10/2009 | Hampton et al. | |
| D608,611 S | 1/2010 | Lowder | |
| 7,806,033 B2 * | 10/2010 | Kocher et al. | 83/835 |
| D642,028 S * | 7/2011 | Fosberg et al. | D8/20 |
| 8,210,081 B2 * | 7/2012 | Elliston et al. | 83/835 |
| D693,661 S * | 11/2013 | Fosberg, Jr. | D8/20 |
| 2001/0004860 A1 | 6/2001 | Kullmann et al. | |
| 2001/0015120 A1 | 8/2001 | Hickey | |
| 2002/0050196 A1 | 5/2002 | Fluhrer et al. | |
| 2002/0184988 A1 | 12/2002 | Rohman et al. | |
| 2003/0010179 A1 | 1/2003 | McLuen | |
| 2003/0051593 A1 * | 3/2003 | Kocher et al. | 83/835 |
| 2003/0094078 A1 * | 5/2003 | Clanton | B23D 61/18 76/101.1 |
| 2004/0035282 A1 | 2/2004 | Tsujimoto | |
| 2004/0050234 A1 | 3/2004 | Fluhrer et al. | |
| 2004/0182218 A1 * | 9/2004 | Chao | 83/848 |
| 2004/0255740 A1 | 12/2004 | Troyer | |
| 2004/0255749 A1 | 12/2004 | Hayden, Sr. | |
| 2005/0211046 A1 | 9/2005 | Thomas et al. | |
| 2005/0257660 A1 | 11/2005 | Hayden, Sr. | |
| 2006/0065098 A1 | 3/2006 | Cranna | |
| 2006/0130628 A1 | 6/2006 | Rompel et al. | |
| 2006/0130629 A1 | 6/2006 | Rompel et al. | |
| 2006/0156892 A1 * | 7/2006 | Losse | B23D 61/04 83/835 |
| 2006/0162526 A1 | 7/2006 | Nagano et al. | |
| 2007/0193427 A1 * | 8/2007 | Hayden | 83/788 |
| 2007/0199416 A1 | 8/2007 | Cook et al. | |
| 2007/0214922 A1 | 9/2007 | Cook et al. | |
| 2007/0251372 A1 | 11/2007 | Petts et al. | |
| 2008/0121079 A1 | 5/2008 | Hashimoto et al. | |
| 2008/0307936 A1 * | 12/2008 | Elliston et al. | 83/13 |
| 2009/0144992 A1 | 6/2009 | Bucks | |
| 2009/0145280 A1 | 6/2009 | Bucks et al. | |
| 2009/0293698 A1 | 12/2009 | Tran et al. | |
| 2011/0259168 A1 | 10/2011 | Butzen et al. | |

FOREIGN PATENT DOCUMENTS

| | | | |
|---|---|---|---|
| FR | 2729321 B1 | 10/1999 | |
| JP | H1119821 A | 1/1999 | |
| JP | 2001-259927 A | 9/2001 | |

* cited by examiner

SAW BLADE WITH ROBUST TOOTH FORM

FIELD OF THE INVENTION

The present invention relates to saw blades, and more particularly, to saw blades, such as reciprocating saw or recip blades, with robust tooth forms.

BACKGROUND INFORMATION

A reciprocating saw machine is a hand-held power saw that includes a chuck for releasably engaging the saw blade and driving the saw blade in a reciprocating motion through a work piece. The reciprocating motion can be an orbital cutting action, a straight or linear cutting action, or an angled cutting action. The length or stroke of the reciprocating motion is typically about 1½ inches or less. Reciprocating saws are sometimes referred to as recip saws, jig saws, and power hack saws, and the term reciprocating saw is used herein without limitation to mean reciprocating saw machines, jigsaw machines, and portable power hack machines. Reciprocating saws are typically driven by electric motors (e.g., cord or cordless saws) or are pneumatically driven. Well known reciprocating saws are sold under the brand names "Sawzall™" by Milwaukee Electric Tool Corporation and "Tiger Saw™" by Porter-Cable Corporation.

A typical reciprocating saw blade includes a blade portion having a cutting edge defined by a plurality of teeth axially spaced relative to each other along one side of the blade, and a non-working edge formed on an opposite side of the blade relative to the cutting edge. A tang for releasably connecting the blade to the chuck of a reciprocating saw extends from an inner end of the blade. The term "recip blade" or "reciprocating saw blade" is used herein to mean a blade configured for use in a reciprocating saw.

Figure 1A:
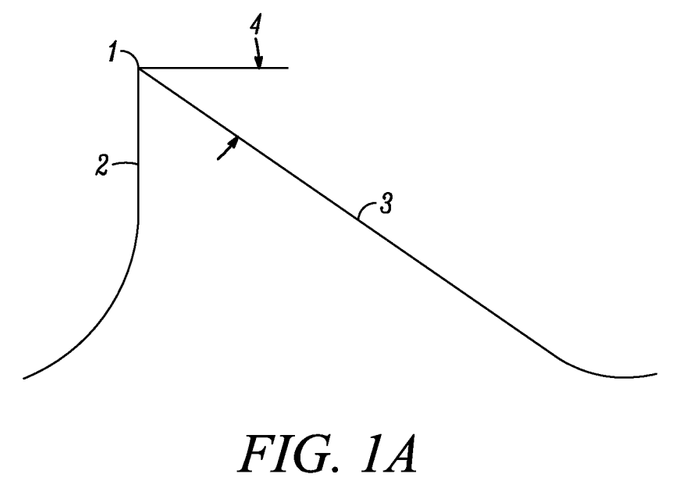
FIG. 1A is a side elevational view of a prior art recip blade tooth form.

As shown in FIG. 1A, a typical prior art recip blade exhibits a tooth form defining a tip 1, a rake face 2 located on one side of the tip, and a clearance surface 3 located on an opposite side of the tip relative to the rake face defining a clearance angle 4. The tooth form of FIG. 1A defines a single or primary clearance surface 3 that runs from the tip of the tooth to the respective gullet radius. In order to cut faster, some such prior art recip blades define relatively steep clearance angles, e.g., about 35° or greater. As a general matter, the steeper the clearance angle, the more sharply pointed is the tooth form, and the faster is the speed of cut. One drawback associated with such prior art recip blades is that the teeth defining such steep clearance angles are relatively weak, and thus prone to premature fracture, particularly when subjected to abusive cutting applications, such as in demolition where there are interrupted cuts of hard objects that are embedded within softer materials, like nail embedded wood, nail or screw embedded sheetrock, or plaster bonded to metal lath.

Figure 1B:
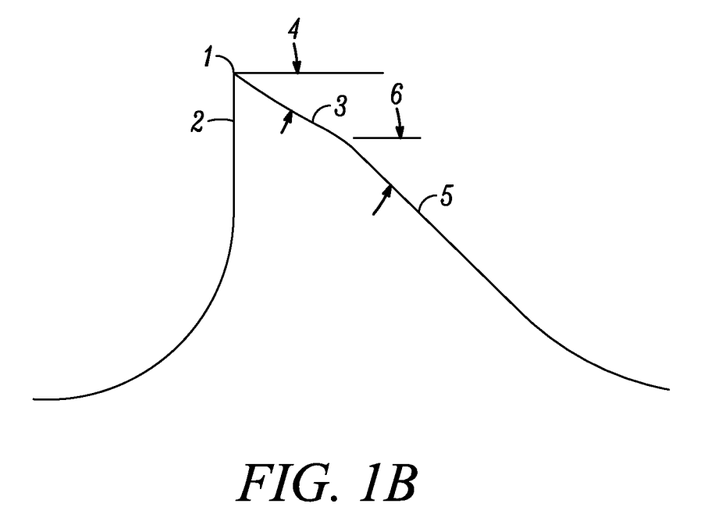
FIG. 1B is a side elevational view of another prior art recip blade tooth form.

Prior art attempts to solve the problem of premature tooth fracture include using different set styles wherein multiple teeth are set to the same position to reinforce the teeth of like set position. Although helpful, this feature has not satisfactorily addressed the problem. Another attempt to solve the problem of premature tooth fracture involves providing the teeth with very low or shallow clearance angles in order to make the teeth wider and more robust. A typical such prior art recip blade is shown in FIG. 1B and exhibits a tooth form defining a tip 1, a rake face 2 located on one side of the tip, a primary clearance surface 3 defining a primary clearance angle 4, and a secondary clearance surface 5 defining a secondary clearance angle 6. As can be seen, the secondary clearance angle 6 is steeper than the primary clearance angle 4. A typical such prior art blade defines a primary clearance angle 4 of about 20° and a secondary clearance angle 6 of about 40°. Although these tooth forms are more robust in comparison to the tooth forms with relatively steep single clearance angles, such tooth forms tend to develop relatively large wear lands at the junction of the tip 1 and primary clearance surface 3 more quickly than otherwise desired for a given amount of vertical wear of the tooth. As a result, one of the drawbacks of this type of tooth form is that the teeth tend to cut more slowly and tend to have a shorter life than otherwise desired in applications where tooth breakage is not the dominant mode of failure.

Accordingly, it is an object of the present invention to overcome one or more of the above-described drawbacks and/or disadvantages of the prior art.

SUMMARY OF THE INVENTION

In accordance with a first aspect, the present invention is directed to a recip blade comprising a recip blade body and a cutting edge extending along the recip blade body that includes a plurality of teeth. Each of a plurality of the teeth includes a primary clearance surface or a primary clearance surface portion defining a relatively steep primary clearance angle, a secondary clearance surface or secondary clearance surface portion defining a relatively shallow secondary clearance angle, a tip, a rake face located on the opposite side of the tip relative to the primary clearance surface portion, and a gullet.

In some embodiments of the present invention, the cutting edge is defined by a repeating pattern of teeth, and at least one tooth of the repeating pattern includes a primary clearance surface defining a relatively steep primary clearance angle and a secondary clearance surface defining a relatively shallow secondary clearance angle. In some such embodiments, the cutting edge is defined by a repeating pattern including two consecutive teeth, and each of the consecutive teeth includes a primary clearance surface defining a relatively steep primary clearance angle and a secondary clearance surface defining a relatively shallow secondary clearance angle.

In currently preferred embodiments of the present invention, each of the two consecutive teeth further includes a first gullet radius located on an opposite side of the gullet relative to the rake face, and a second gullet radius located between the gullet and the rake face, wherein the depth of the gullet is greater than the second gullet radius.

In currently preferred embodiments of the present invention, the second gullet radius is greater than the first gullet radius, each primary clearance angle is within the range of about 25° to about 45°, and each secondary clearance angle is within the range of about 15° to about 25°. The rake face preferably defines a depth that is within the range of about 20% to about 60% of the preceding gullet depth, and more preferably defines a depth that is within the range of about 30% to about 50% of the preceding gullet depth. The primary clearance surface or primary clearance surface portion preferably defines a depth that is within the range of about 10% to about 45% of the succeeding gullet depth, and more preferably is within the range of about 15% to about 40% of the succeeding gullet depth. The present invention is particularly suitable for use in connection with recip blades defining a pitch equal to about 14 pitch or coarser.

In some embodiments of the present invention, one of the two teeth of the repeating pattern defines a steeper primary clearance angle than the other, and a more shallow secondary clearance angle than the other. In some such embodiments, the tooth defining the steeper primary clearance angle and more shallow secondary clearance angle defines a lower height than the other tooth. The difference in height between the two teeth prior to tooth set preferably is within the range of about 0.002 inch to about 0.010 inch, and more preferably is within the range of about 0.003 inch to about 0.005 inch.

In some embodiments of the present invention, the repeating pattern including two consecutive teeth defines a plurality of set teeth including at least one first set tooth set to a first set direction, and at least one second set tooth set to a second set direction opposite the first set direction. In some such embodiments, the repeating pattern including two consecutive teeth further defines at least one relatively light first set tooth set to a relatively light first set magnitude, at least one relatively heavy first set tooth set to a relatively heavy first set magnitude, at least one relatively light second set tooth set to a relatively light second set magnitude, and at least one relatively heavy second set tooth set to a relatively heavy second set magnitude. In some such embodiments, the repeating pattern defines a leading light first set tooth, a heavy first set tooth trailing the light first set tooth, a light second set tooth trailing the heavy first set tooth, and a heavy second set tooth trailing the light second set tooth. Preferably, the tips of the heavy set teeth are lower than the tips of the light set teeth. In some such embodiments, the repeating pattern further defines at least one unset tooth. In some such embodiments, the repeating pattern defines a leading light first set tooth, a heavy first set tooth trailing the light first set tooth, a pair of consecutive unset teeth trailing the pair of first set teeth, a light second set tooth trailing the pair of unset teeth, and a heavy second set tooth trailing the light second set tooth. In these embodiments the tips of the heavy set teeth are preferably lower than the tips of the light set teeth.

In some embodiments of the present invention, the repeating pattern including two consecutive teeth further defines at least one leading unset tooth and at least one trailing set tooth with respect to a cutting direction of the saw blade. In some such embodiments, the at least one trailing set tooth includes a first set tooth set to a first direction, and a second set tooth set to a second direction opposite the first direction. In some such embodiments, the repeating pattern further defines a leading first unset tooth, a first set tooth trailing the leading unset tooth, a second unset tooth trailing the first set tooth, and a second set tooth trailing the second unset tooth. The tips of the unset teeth are preferably higher than the tips of the set teeth.

In some embodiments of the present invention, the repeating pattern including the consecutive teeth includes a first pair of consecutive leading teeth set in a first direction, and a second pair of consecutive trailing teeth set in a second direction opposite the first direction. In some embodiments of the present invention, the first pair includes a relatively light set tooth followed by a relatively heavy set tooth, and the second pair includes a relatively light set tooth followed by a relatively heavy set tooth. In some such embodiments, the repeating pattern further includes a pair of consecutive unset teeth located between the first and second pairs of teeth. In some such embodiments, the tip of each leading tooth in each pair of consecutive teeth is higher than the tip of each trailing tooth in each pair of consecutive teeth.

In currently preferred embodiments of the present invention, the repeating pattern is defined by repeating pairs of the two consecutive teeth without any other teeth located therebetween. In addition, each tooth defines a tertiary clearance surface or tertiary clearance surface portion defining a tertiary clearance angle, and each tertiary clearance angle is greater than the respective secondary clearance angle. Preferably, each tooth defines a tertiary clearance angle that is greater than the respective primary clearance angle, and a primary clearance angle that is greater than the respective secondary clearance angle.

In some currently preferred embodiments of the present invention, the recip blade includes a tang formed at one end of the blade and a tip formed at an opposite end of the blade relative to the tang. The cutting edge further defines an unset tooth located at the tip and defining a clearance surface forming the tip, and at least one of (i) at least one relatively short tooth located between the unset tip tooth and the other teeth, and (ii) at least one additional unset tooth located between the unset tip tooth and the other teeth. In some such embodiments, the cutting edge defines two relatively short consecutive teeth located between the relatively tall unset tip tooth and the repeating pattern of two consecutive teeth. Preferably, each of the two relatively short teeth is either unset or defines a light set. In some such embodiments, the at least one relatively short tooth is about 30% to about 90% shorter than the unset tip tooth.

In accordance with another aspect, the present invention is directed to a recip blade comprising a recip blade body and a cutting edge extending along the blade body and including a plurality of teeth. Each of a plurality of the teeth includes a tip, a rake face located on one side of the tip, a gullet located on an opposite side of the rake face relative to the tip, first means located on an opposite side of the tip relative to the rake face for imparting cutting speed to the tooth and defining a first clearance angle, and second means located on an opposite side of the first means relative to the tip for imparting toughness to the tooth and defining a secondary clearance angle that is less than the first clearance angle.

In currently preferred embodiments of the present invention, each of the teeth including the first and second means further includes a first gullet radius located on an opposite side of the gullet relative to the rake face, and a second gullet radius located between the gullet and the rake face that is less than the depth of the gullet.

In the currently preferred embodiments, the first clearance angle is within the range of about 25° to about 45°, the secondary clearance angle is within the range of about 15° to about 25°, and the rake face defines a depth that is within the range of about 20% to about 60% of the preceding gullet depth. Also in the currently preferred embodiments, the cutting edge includes a repeating pattern defined by repeating pairs of two consecutive teeth without any other teeth located therebetween. One tooth of each pair defines a first clearance angle that is greater than the first clearance angle of the other tooth of the pair, a secondary clearance angle that is less than the secondary clearance angle of the other tooth of the pair, and a tip that is lower than the tip of the other tooth of the pair. Also in the currently preferred embodiments, the first means is a primary clearance surface, and the second means is a secondary clearance surface.

In accordance with another aspect, the present invention is directed to a recip blade comprising a recip blade body and a linear cutting edge extending along the recip blade body and defined by a repeating pattern of two consecutive teeth without any other teeth located therebetween. Each of the two consecutive teeth includes a primary clearance surface defining a relatively steep primary clearance angle, a secondary clearance surface defining a relatively shallow secondary clearance angle, a tip, a rake face located on the opposite side of the tip relative to the primary clearance surface, and a gullet.

In currently preferred embodiments of the present invention, each of the two consecutive teeth further includes a first gullet radius located on an opposite side of the gullet relative to the rake face, and a second gullet radius located between the gullet and the rake face, wherein the gullet defines a depth that is greater than the second gullet radius.

In the currently preferred embodiments of the recip blade, one tooth of each pair defines a first clearance angle that is greater than the first clearance angle of the other tooth of the pair, a secondary clearance angle that is less than the secondary clearance angle of the other tooth of the pair, and a tip that is lower than the tip of the other tooth of the pair.

One advantage of the recip blades of the present invention is that they have practical applicability in relatively abusive cutting applications, such as in demolition when cutting wood with nails. For example, features of the present invention are particularly suitable for use in connection with recip blades that are relatively coarse, such as 14 pitch and coarser blades (e.g., 14, 10, 8, 6 and other similarly coarse pitches, such as ⅝, 6/10, ⅝ etc.). A further advantage of the recip blades of the invention is that they can withstand large forces encountered in abusive cutting applications, such as demolition applications involving wood with nails, but also can cut well at high speeds and exhibit long life in non-abusive cutting applications. In abusive applications (such as cutting nail embedded wood or sheet rock with screws or nails) some of the tips or primary clearance surfaces or primary clearance surface portions of the teeth might break off; however, the relatively shallow secondary clearance surfaces or secondary clearance surface portions will not fracture and thus permit continued use of the blades. Accordingly, the relatively shallow secondary clearance angles make the teeth less susceptible to catastrophic failure in abusive applications, while the relatively steep primary clearance angles permit fast and efficient cutting.

Other objects and advantages of the present invention, and/or of the currently preferred embodiments thereof, will become more readily apparent in view of the following detailed description of the currently preferred embodiments and the accompanying drawings.

DETAILED DESCRIPTION OF THE CURRENTLY PREFERRED EMBODIMENTS

Figure 2:
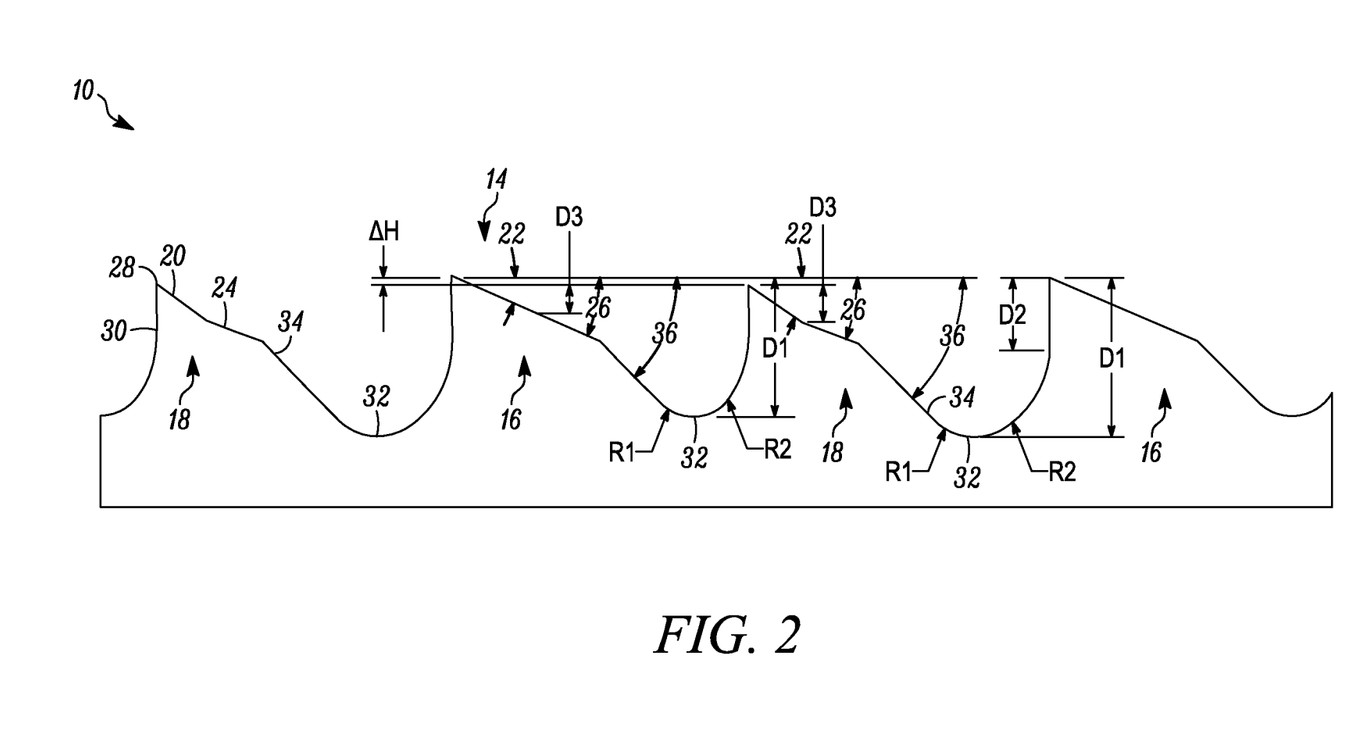
FIG. 2 is partial, side elevational view of a saw blade, such as a recip blade, embodying the present invention.

In FIG. 2, a saw blade embodying the present invention is indicated generally by the reference numeral 10. The saw blade 10 comprises a blade body 12 and a cutting edge 14 extending along the blade body 12 and defined by a repeating pattern of two consecutive teeth 16, 18, including a first tooth 16 and a second tooth 18. The first tooth 16 includes a primary clearance surface portion 20 defining a primary clearance angle 22, a secondary clearance surface portion 24 defining a secondary clearance angle 26, a tip 28, a rake face 30 located on the opposite side of the tip 28 relative to the primary clearance surface portion 20, a gullet 32 defining a depth "D1", a first gullet radius "R1" located on an opposite side of the gullet 32 relative to the rake face 30, and a second gullet radius "R2" located between the gullet 32 and the rake face 30. In the illustrated embodiment, the primary and secondary clearance angles 22, 26 of the first tooth 16 are equal to each other. In other embodiments, however, the secondary clearance angle 26 of the first tooth 16 is relatively shallow as compared to the primary clearance angle 22 of the first tooth 16. In the illustrated embodiment, the second tooth 18 includes a primary clearance surface 20 defining a relatively steep primary clearance angle 22, a secondary clearance surface 24 defining a relatively shallow secondary clearance angle 26, a tip 28, a rake face 30 located on the opposite side of the tip 28 relative to the primary clearance surface 20, a gullet 32 defining a depth "D1", a first gullet radius "R1" located on an opposite side of the gullet 32 relative to the rake face 30, and a second gullet radius "R2" located between the gullet 32 and the rake face 30.

As shown in FIG. 2, the depth D1 of each gullet 32 is greater than the second gullet radius R2, and the second gullet radius R2 is greater than the first gullet radius R1. Each primary clearance angle 22 is within the range of about 25° to about 45°, and each secondary clearance angle 26 is within the range of about 15° to about 25°. Each second tooth 18 of the repeating pattern of two teeth defines a steeper primary clearance angle 22 than the other, and a more shallow secondary clearance angle 26 than the other. Preferably each first tooth 16 defines a primary clearance angle 22 that is within the range of about 20° to about 30° and a secondary clearance angle 26 that is within the range of about 17° to about 27°, and each second tooth 18 defines a primary clearance angle 22 that is within the range of about 30° to about 40° and a secondary clearance angle 26 that is within the range of about 15° to about 25°. In the illustrated embodiments, each first tooth 16 defines a primary clearance angle 22 of about 25°, and a secondary clearance angle 26 of about 22°, and each second tooth 18 defines a primary clearance 22 of about 35°, and a secondary clearance angle 26 of about 20°. As may be recognized by those of ordinary skill in the pertinent art based on the teachings herein, these clearance angles are only exemplary, and other clearance angles equally may be employed.

Each rake face 30 defines a depth D2 that is within the range of about 20% to about 60% of the preceding gullet depth D1 with respect to the cutting direction of the saw blade, and preferably defines a depth D2 that is within the range of about 30% to about 50% of the preceding gullet depth D1. In addition, each first tooth 16 defines a rake face depth D2 that is greater than the rake face depth D2 of the respective second tooth 18 of the pair. In the illustrated embodiment, the rake face depth D2 of each first tooth 16 is about 0.03 inch, and the rake face depth D2 of each second tooth 18 is about 0.04 inch. The primary clearance surface portion 20 of each first tooth 16 and the primary clearance surface 20 of each second tooth 18 defines a depth D3 that is preferably within the range of about 10% to about 45% of the succeeding gullet depth D1 with respect to the cutting direction of the saw blade, and more preferably is within the range of about 15% to about 40% of the gullet depth D1. In the illustrated embodiment, the primary clearance surfaces and primary clearance surface portions 20 of the first and second teeth 16, 18 define approximately the same depth D3. The depth D3 is preferably within the range of about 0.005 to about 0.040 inch, and in the illustrated embodiment, D3 is about 1/50 inch. As also shown in FIG. 2, the gullet depth D1 of each first tooth 16 is greater than the gullet depth of each second tooth 18. In the illustrated embodiment, the gullet depth of each first tooth 16 is about 0.09 inch, and the gullet depth of each second tooth 18 is about 0.08 inch. As may be recognized by those of ordinary skill in the pertinent art based on the teachings herein, the rake face and clearance surface or clearance surface portion depths disclosed herein are only exemplary and other depths equally may be employed.

As also shown in FIG. 2, each second tooth 18 defining the steeper primary clearance angle 22 and more shallow secondary clearance angle 26 defines a lower height than the other tooth prior to any tooth set, i.e., the tip of the second tooth 18 is lower than the tip of the preceding first tooth 16 prior to any tooth set. The difference in height "Ah" between the two teeth 16, 18 prior to tooth set is within the range of about 0.002 inch to about 0.010 inch, is preferably within the range of about 0.002 inch to about 0.008 inch, and is more preferably within the range of about 0.003 inch to about 0.005 inch. One advantage of the saw blades of the present invention is that the relatively robust tooth forms permit a relatively large height differential (e.g., up to about 0.010 inch) between the teeth which, in turn, allows for faster and more efficient cutting speeds in comparison to blades without such tooth height differentials. Although the significant tooth height differential can subject the teeth to higher cutting forces in comparison to blades without such tooth height differentials, the tooth forms of the invention substantially prevent premature tooth fracture under such increased cutting forces.

As also shown in FIG. 2, each tooth 16, 18 defines a tertiary clearance surface 34 defining a tertiary clearance angle 36. Each tertiary clearance angle 36 is greater than the respective secondary clearance angle 26. In the currently preferred embodiments, each tooth 16, 18 defines a tertiary clearance angle 36 that is greater than the respective primary clearance angle 22, and a primary clearance angle 22 that is greater than the respective secondary clearance angle 26. In the illustrated embodiments, the tertiary clearance angles 36 of the first and second teeth 16, 18 are approximately equal to each other. The tertiary clearance angles 36 are preferably within the range of about 40° to about 50°, and in the illustrated embodiment, each tertiary clearance angle is about 45°. As may be recognized by those of ordinary skill in the pertinent art based on the teachings herein, these clearance angles are only exemplary and other clearance angles equally may be employed.

In the currently preferred embodiments of the present invention, the saw blade is a recip blade defining a linear cutting edge. In the currently preferred embodiments of the recip blade, the "attack angle" or "tang angle" is preferably within the range of about 3° to about 7°. One advantage of this feature is that it causes the teeth of the blade to enter the work piece at an angle different than that otherwise defined by the plane of the tooth tips (or the plane defined by the tips of the unset teeth). This allows the blade to remain aggressive with deep penetration in the cut for more efficient cutting. In addition, the robust tooth forms of the invention permit such an aggressive tang angle while substantially preventing the premature tooth fracture that otherwise might be associated with such an aggressive tang angle in abusive or other demanding applications. Also in the currently preferred embodiments, the repeating pattern is defined by repeating pairs of the two consecutive teeth 16, 18 without any other teeth located therebetween. The repeating pattern of two consecutive teeth 16, 18 preferably defines a pitch equal to about 14 pitch or coarser, e.g., 14, 10, 8, 6 and other similarly coarse pitches, such as 5/8, 6/10, 6/8, etc. These relatively coarse pitches are particularly suitable for recip blades for cutting wood and/or for demolition applications, such as for cutting nail embedded wood or sheet rock with screws or nails. However, as may be recognized by those of ordinary skill in the pertinent art based on the teachings herein, these pitches are exemplary and other pitches equally may be employed.

Figure 3:
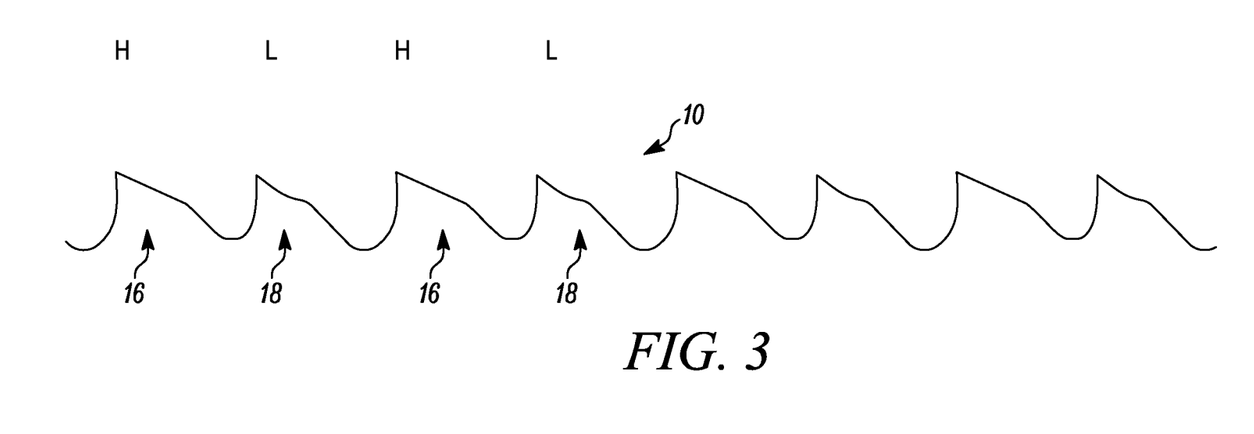
FIG. 3 is a partial, side elevational view of another embodiment of a saw blade of the present invention illustrating a first set pattern.
Figure 4:
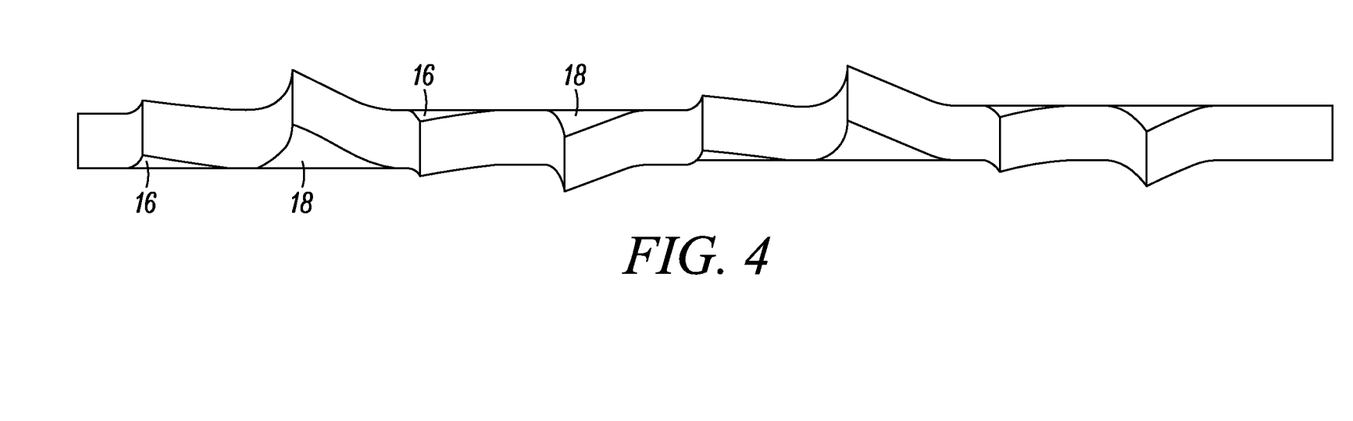
FIG. 4 is a partial, top plan view of the saw blade of FIG. 3.

As shown in FIGS. 3 and 4, the saw blade 10 includes a repeating pattern of two consecutive teeth 16, 18 having a set pattern defined by a plurality of set teeth including at least one first set tooth set to a first set direction, such as the "left" set direction, and at least one second set tooth set to a second set direction opposite the first set direction, such as the "right" set direction. As shown in FIG. 4, the "left" set direction is located to the left side of the blade when viewed from the cutting direction of the saw blade, and the "right" set direction is located to the right side of the blade when viewed from the cutting direction of the saw blade. The set pattern of the blade 10 defines a relatively light first set tooth 16 set to a relatively light first set magnitude (i.e., "light left"), a relatively heavy first set tooth 18 set to a relatively heavy first set magnitude (i.e., "heavy left"), a relatively light second set tooth 16 set to a relatively light second set magnitude (i.e., "light right"), and a relatively heavy second set tooth 18 set to a relatively heavy second set magnitude (i.e., "heavy right"). Accordingly, the repeating pattern of two consecutive teeth of the saw blade 10 has a four tooth set pattern/two tooth mill pattern defined by a leading light first or left set tooth 16, a heavy first or left set tooth 18 trailing the light first or left set tooth, a light second or right set tooth 16 trailing the heavy first or left set tooth, and a heavy second or right set tooth 18 trailing the light second or right set tooth 16. As shown in FIG. 3, the tips of the heavy set teeth are lower (designated by the letter "L" for "low") than the tips of the light set teeth (designated by the letter "H" for "high").

Figure 5:
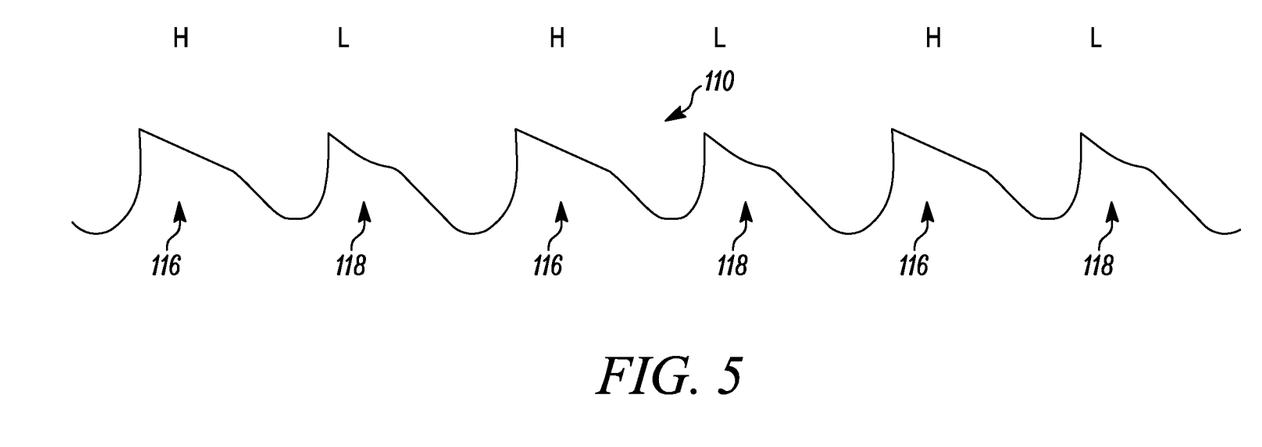
FIG. 5 is a partial, side elevational view of another embodiment of a saw blade of the present invention illustrating a second set pattern.
Figure 6:
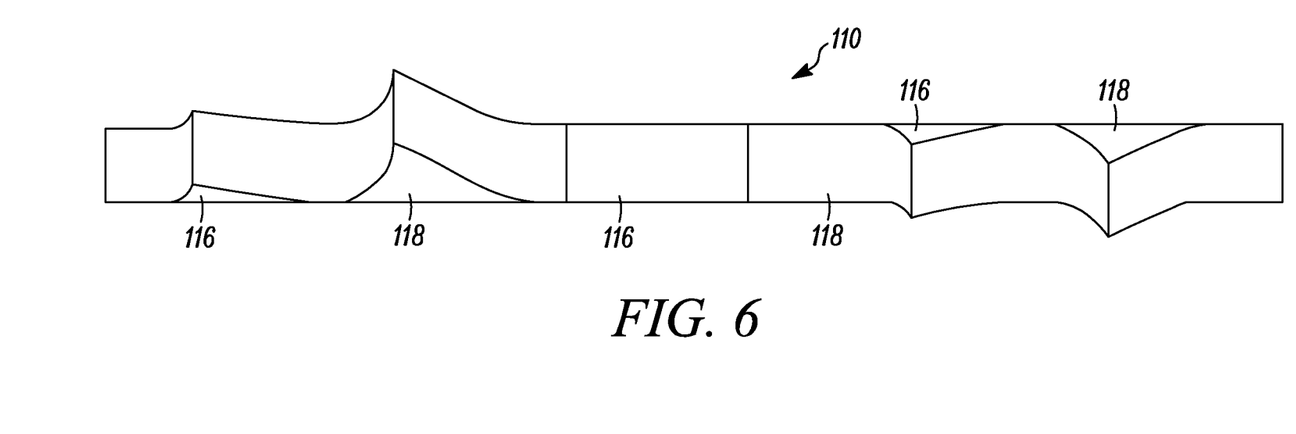
FIG. 6 is a partial, top plan view of the saw blade of FIG. 5.

In FIGS. 5 and 6, another embodiment of a saw blade of the present invention is indicated generally by the reference numeral 110. The saw blade 110 is substantially the same as the saw blade 10 described above with reference to FIGS. 2 through 4, and therefore like reference numerals preceded by the numeral "1" are used to indicate like elements. The tooth forms of the saw blade 110 are the same as the saw blade 10, and therefore the illustration of FIG. 2 and the associated detailed description equally apply to the saw blade 110 of FIGS. 5 and 6. The saw blade 110 differs from the saw blade 10 with respect to the set pattern. The repeating pattern of two consecutive teeth of the saw blade 110 further defines a pair of unset teeth. As shown in FIG. 6, the repeating pattern of two consecutive teeth of the saw blade 110 defines a leading light first or left set tooth 116, a heavy first or left set tooth 118 trailing the light first set tooth, a pair of consecutive unset teeth 116, 118 trailing the pair of first set teeth, a light second or right set tooth 116 trailing the pair of unset teeth, and a heavy second or right set tooth 118 trailing the light second set tooth. As shown in FIG. 6, the tips of the heavy set teeth are lower than the tips of the light set teeth.

Figure 7:
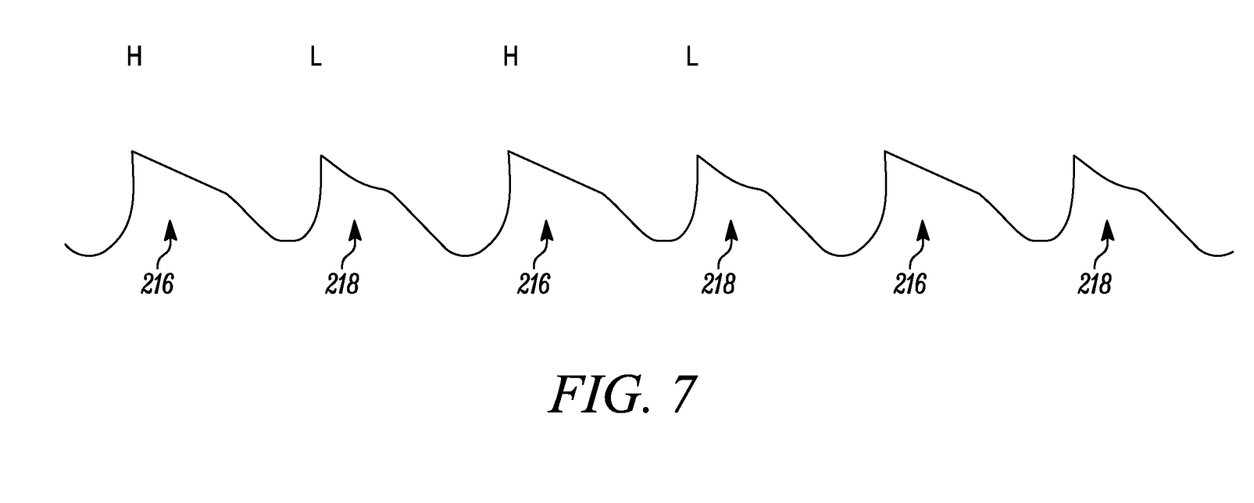
FIG. 7 is a partial, side elevational view of another embodiment of a saw blade of the present invention illustrating a third set pattern.
Figure 8:
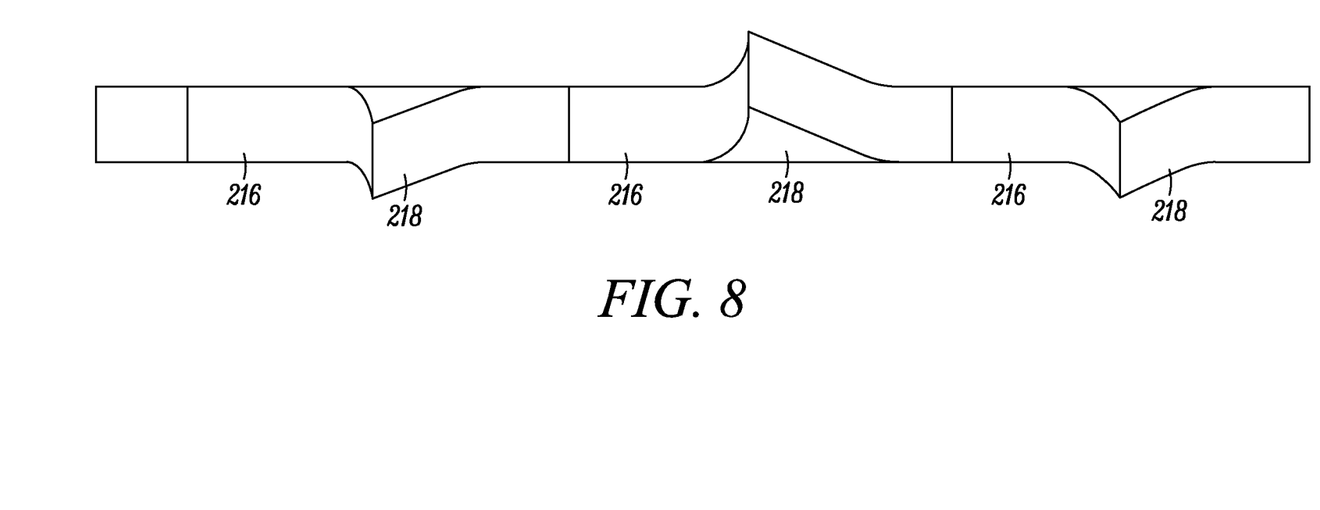
FIG. 8 is a partial, top plan view of the saw blade of FIG. 7.

In FIGS. 7 and 8, another embodiment of a saw blade of the present invention is indicated generally by the reference numeral 210. The saw blade 210 is substantially the same as the saw blades 10 and 110 described above with reference to FIGS. 2 through 6, and therefore like reference numerals preceded by the numeral "2", or preceded by the numeral "2" instead of the numeral "1", are used to indicate like elements. The tooth forms of the saw blade 210 are the same as the saw blades 10 and 110 described above in connection with FIGS. 2 through 6, and therefore the illustration of FIG. 2 and the associated detailed description equally apply to the saw blade 210 of FIGS. 7 and 8. The saw blade 210 differs from the saw blades 10 and 110 with respect to the set pattern. As shown in FIG. 8, the repeating pattern of two consecutive teeth 216, 218 defines a leading first unset tooth 216, a first or right set tooth 218 trailing the leading unset tooth, a second unset tooth 216 trailing the first or right set tooth, and a second or left set tooth 218 trailing the second unset tooth. As shown in FIG. 7, the tips of the unset teeth 216 are higher than the tips of the set teeth.

Figure 9:
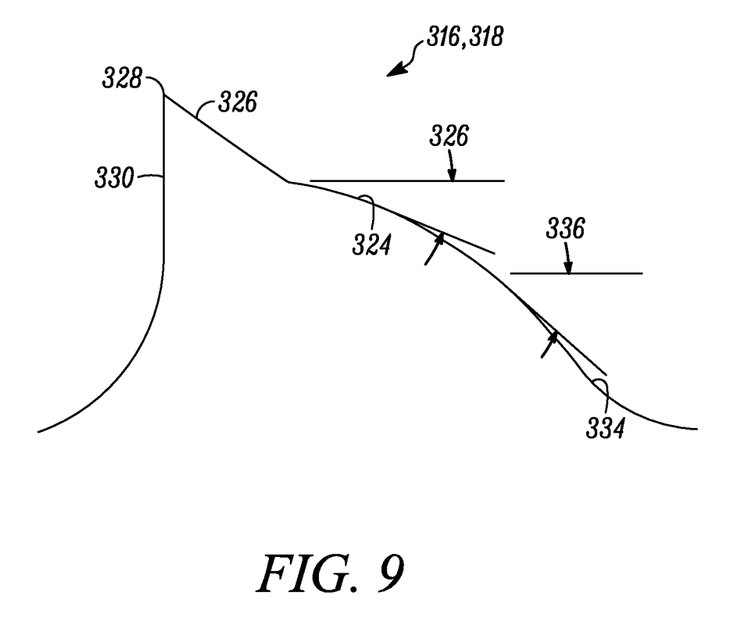
FIG. 9 is a another embodiment of a tooth form of the present invention.

In FIG. 9, another embodiment of a tooth form of the invention is indicated generally by the reference numerals 316, 318. The tooth form 316, 318 is substantially the same as the second tooth forms 18 described above in connection with FIG. 2, and therefore like reference numerals preceded by the numeral "3" are used to indicate like elements. The difference of the tooth form 316, 318 in comparison to the tooth forms described above is that the secondary and tertiary clearance surfaces 324 and 336 are defined by a curvilinear surface. The curvilinear surface is defined by one or more radii. The secondary clearance angle 326 is defined by a tangent to the portion of the curvilinear surface defining the secondary clearance surface 324, and the tertiary clearance angle 336 is defined by a tangent to the portion of the curvilinear surface defining the tertiary clearance surface 334. Although only one tooth form is shown in FIG. 9, this tooth form may define different dimensions, tooth heights, primary and secondary clearance angles, rake face depths, primary clearance angle depths, and gullet depths, to form the respective first and second teeth 316 and 318, respectively, as described above in connection with FIG. 2.

Figure 10:
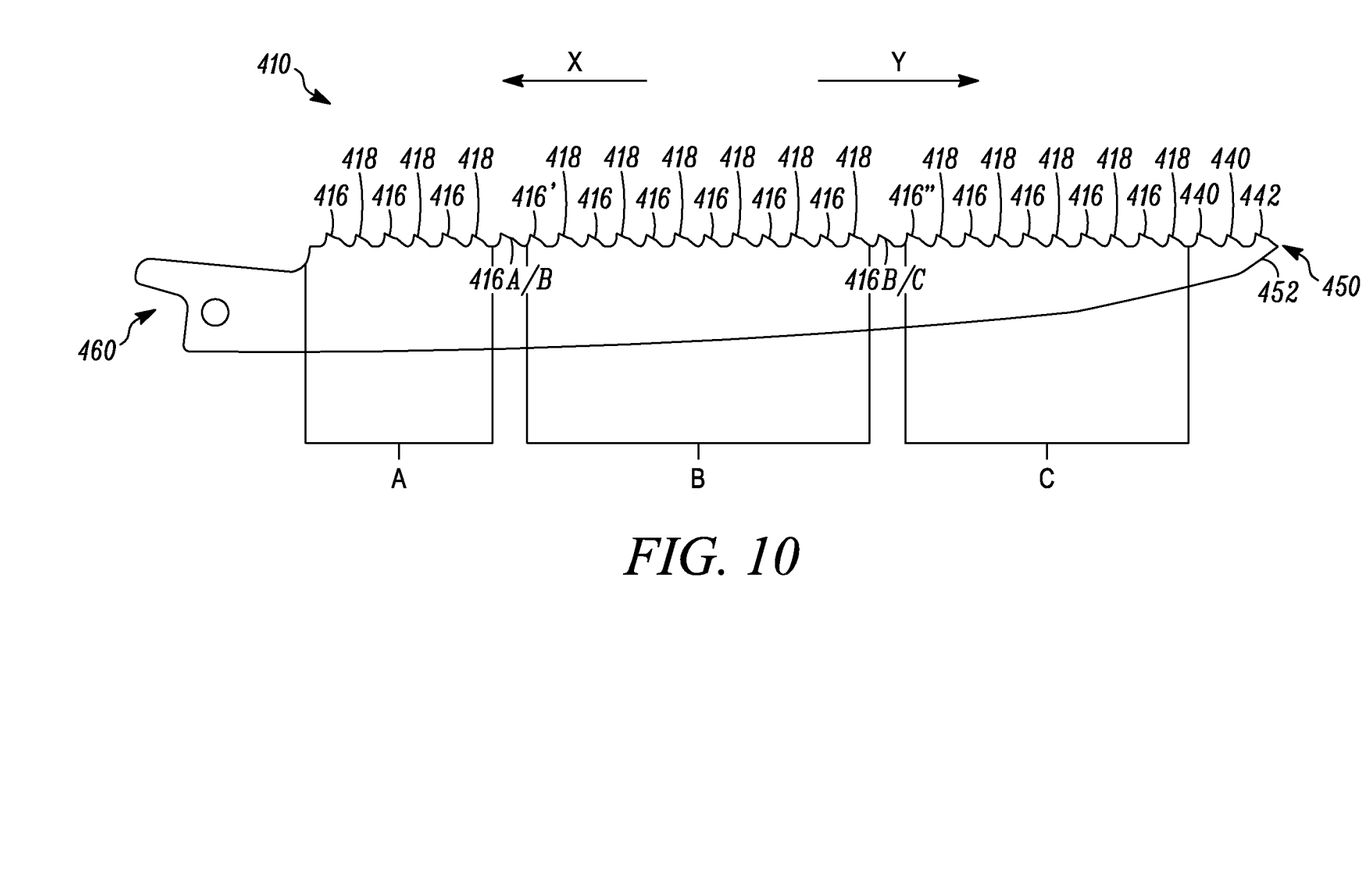
FIG. 10 is a side elevational view of another embodiment of a saw blade of the present invention that is configured for plunge cutting.
Figure 11:
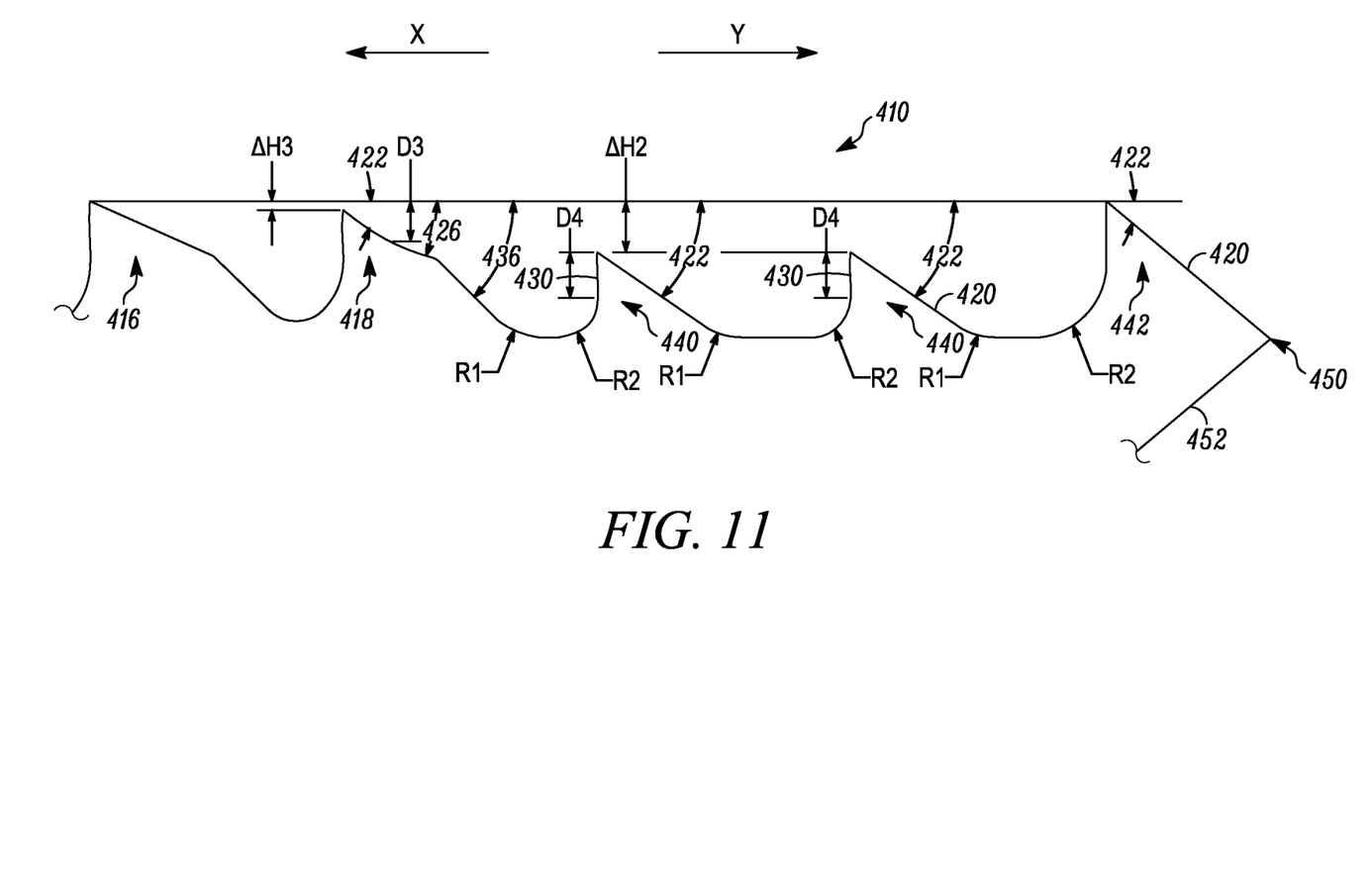
FIG. 11 is a partial, side elevational view of the saw blade of FIG. 10 illustrating the teeth that are adjacent to the blade's tip.
Figure 12:
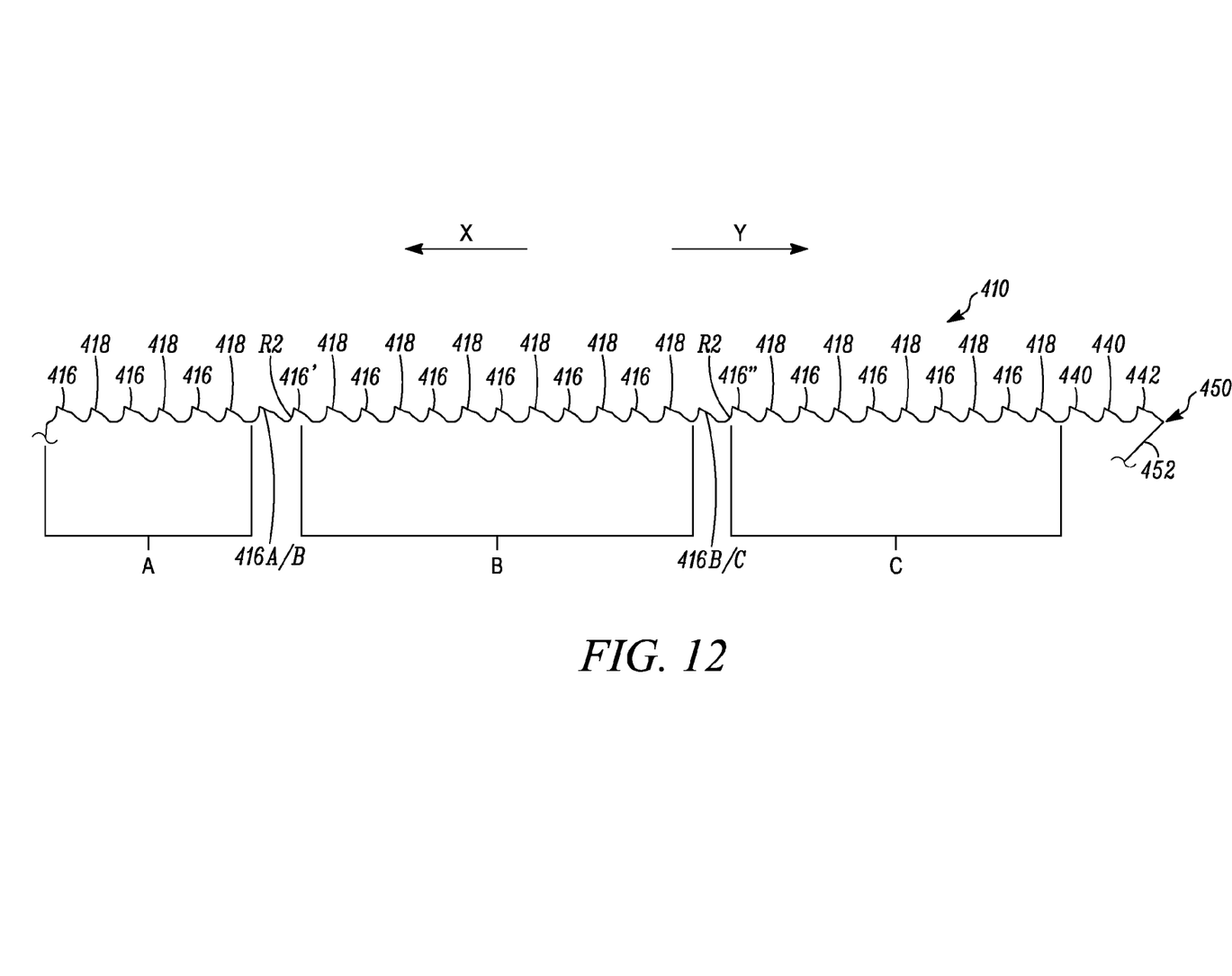
FIG. 12 is a partial, side elevational view of the saw blade of FIG. 10 illustrating the teeth of the blade.

In FIGS. 10-12, another embodiment of a saw blade of the present invention is indicated generally by the reference numeral 410. As shown in FIG. 10, the saw blade 410 is a recip blade that is configured for plunge cutting. One end of the recip blade 410 defines a tang 460 for connection to a chuck of a power saw (not shown) and the opposing end defines a tip 450 for puncturing and plunging into a workpiece. Cutting teeth are arranged on a cutting edge that extends between the tang 460 and the tip 450. The teeth define a cutting direction as indicated by the arrow "x" and a reverse cutting direction as indicated by the arrow "y". As shown in FIGS. 10 and 12, the cutting teeth include a repeating pattern of two consecutive set teeth 416, 418 and unset raker teeth 416A/B and 416B/C located between respective series of set teeth 416, 418. More specifically, the cutting edge defines a first series A of three consecutive pairs of set teeth 416, 418, a second series B of six consecutive pairs of set teeth 416, 418, a first unset tooth 416A/B located between the first and second series of set teeth A and B, respectively, a third series C of five consecutive pairs of set teeth 416, 418, a second unset tooth 416 B/C located between the second and third series of set teeth B and C, respectively, a raker tooth 442 contiguous to the tip 450, and a pair of consecutive relatively short teeth 440, 440 located between the third series C of set teeth and the raker tooth 442 at the tip.

The cutting teeth of the saw blade 410 are substantially the same as the saw blades 10 and 110 described above with reference to FIGS. 2 through 6, and therefore like reference numerals preceded by the numeral "4", or preceded by the numeral "4" instead of the numeral "1", are used to indicate like elements. Specifically, the first teeth 416 and the second teeth 418 of the repeating pattern of two consecutive set teeth, the first unset tooth 416A/B, and the second unset tooth 416B/C are the same tooth forms as the first teeth 16, 116 and second teeth 18, 118 respectively, of the saw blades 10 and 110 described above. Therefore, the illustration of FIG. 2 and the associated detailed description equally apply to the first teeth 416, the second teeth 418, the first unset tooth 416A/B and the second unset tooth 416B/C of the saw blade 410. As shown in FIGS. 10 and 11 and as described above, the saw blade 410 differs from the saw blades 10 and 110 in that the blade 410 includes the two short teeth 440 and the raker tooth 442 at the tip 450, and two unset teeth 416A/B, 416B/C located between respective series of set teeth.

As shown in FIGS. 10 and 12, the first series A of teeth includes three consecutive pairs of first and second set teeth 416, 418, respectively. The set pattern of the first series A of set teeth is as follows: a light left tooth 416, a heavy left tooth 418, a light right tooth 416, a heavy right tooth 418, a light left tooth 416, and a heavy left tooth 418.

The first series A of set teeth is followed by the first unset tooth 416A/B which, in turn, is followed by the second series B of set teeth. The second series B of set teeth includes six consecutive pairs of first and second set teeth 416, 418, respectively. The set pattern of the second series B of set teeth is a continuum of the set pattern of the preceding series A of set teeth. Accordingly, the set pattern of the second series B is as follows: a light right tooth 416, a heavy right tooth 418, a light left tooth 416, a heavy left tooth 418, a light right tooth 416, a heavy right tooth 418, a light left tooth 416, a heavy left tooth 418, a light right tooth 416, a heavy right tooth 418, a light left tooth 416, and a heavy left tooth 418.

The second series B of set teeth is followed by the second unset tooth 416B/C which, in turn, is followed by the third series C of set teeth. The third series C of set teeth includes five consecutive pairs of first and second set teeth 416, 418, respectively. The set pattern of the third series C of set teeth is a continuum of the set patterns of the preceding first and second series of set teeth A and B, respectively. Accordingly, the set pattern of the third series C is as follows: a light right tooth 416, a heavy right tooth 418, a light left tooth 416, a heavy left tooth 418, a light right tooth 416, a heavy right tooth 418, a light left tooth 416, a heavy left tooth 418, a light right tooth 416, and a heavy right tooth 418. As can be seen, the first, second and third series of set teeth A, B and C, respectively, define a continuous four-tooth repeating set pattern (that is interrupted at the first and second unset teeth 416A/B, 416B/C, respectively) as follows: a light left set tooth, followed by a heavy left set tooth, a light right set tooth, and a heavy right set tooth.

In an alternative embodiment (not shown), the unset teeth of the first tooth form 416 are positioned along the repeating pattern of consecutive pairs of set teeth 416, 418 at predetermined spaced intervals, such as at about every two inches of pitch. Accordingly, in such embodiments defining a constant pitch, for example, two or more series of set teeth may include the same number of teeth.

As shown in FIG. 12, the lead tooth 416' of the second series B of set teeth and the lead tooth 416" of the third series C of set teeth each defines a second gullet radius R2 that is less than that of all of the other first teeth 416 and second teeth 418 on the blade 410, including that of the first unset tooth 416A/B and the second unset tooth 416B/C. In the illustrated embodiment, the second gullet radius R2 of the lead teeth 416', 416" is about ½5 inch. As may be recognized by those of ordinary skill in the pertinent art based on the teachings herein, this gullet radius is only exemplary, and other gullet radii equally may be employed.

As shown in FIG. 11, each short tooth 440 located between the third series C of set teeth and tip tooth 442 defines a single clearance surface 420 that is set at a clearance angle 422 that is greater than the primary clearance angle 422 of the first teeth 416 and substantially the same as the primary clearance angle 422 of the second teeth 418. Accordingly, each clearance angle 422 of the short teeth 440, 440 is within the range of about 30° to about 40°. In the illustrated embodiment, each short tooth 440 defines a primary clearance angle 422 of about 35°. The height of the short teeth 440, 440 limits their set magnitude such that the short teeth 440, 440 are either unset or define a light set. In the illustrated embodiment, as indicated above, the preceding teeth 416, 418 of the third series C of set teeth C are light right set and heavy right set, respectively. Accordingly, consistent with the four-tooth repeating set pattern of the recip blade 410, the two short teeth 440, 440 define a light left set. However, as may be recognized by those of ordinary skill in the pertinent art based on the teachings herein, the illustrated number of short teeth and their set are only exemplary. For example, the short teeth may be unset, may define a right set, may define different set magnitudes than each other, and/or the blade may include only one short tooth, or may include more than two short teeth.

As shown in FIG. 11, the short teeth 440, 440 define a lower height than the heights of all of the other teeth on the blade 410, i.e., the tip of each short tooth 440 is lower than the tips of all of the other teeth on the blade 410 prior to any tooth set. The short teeth 440, 440 are preferably about 30% to about 90% shorter than the unset tip tooth 442. The difference in height "ΔH2" between the short teeth 440, 440 and both the first teeth 416 and the unset tip or raker tooth 442 prior to any tooth set is within the range of about 0.01 inch to about 0.05 inch, and preferably is within the range of about 0.02 inch to about 0.4 inch. In the illustrated embodiment, the short teeth 440, 440 are about 0.03 inch shorter than the first teeth 416 and the raker tooth 442 prior to any tooth set. As also shown in FIG. 11, the short teeth 440, 440 define a rake face depth D4 that is less than the rake face depth D2 of each of the first teeth 416 and the second teeth 418. In the illustrated embodiment, the rake face depth D4 of the short teeth 440, 440 is about 0.028 inch. The short teeth 440, 440 also define a first gullet radius R1 that is greater than the first gullet radius R1 of each of the first teeth 416 and the second teeth 418, and a second gullet radius R2 that is less than the second gullet radius R2 of each of the first teeth 416 and the second teeth 418. In the illustrated embodiment, the first gullet radius R1 of the short teeth 440, 440 is about 0.045 inch and the second gullet radius R2 of the short teeth 440, 440 is about 0.025 inch. As may be recognized by those of ordinary skill in the pertinent art based on the teachings herein, the clearance angles, tooth heights, gullet radii and rake face depths are only exemplary, and other clearance angles, tooth heights, gullet radii and rake face depths equally may be employed.

As shown best in FIG. 11, the tip or raker tooth 442 is unset, is taller than each of the short teeth 440, 440 and the second teeth 418, and is about the same height as the first teeth 416 prior to any tooth set. The raker tooth 442 includes a single clearance surface 420 that is oriented at a clearance angle 422 that is greater than the clearance angle 422 of the short teeth 440, 440, the primary clearance angle 422 of the first teeth 416, and the primary clearance angle 422 of the second teeth 418. The clearance angle 422 of the clearance surface 420 of the raker tooth 442 is within the range of about 35° to about 45°. In the illustrated embodiment, the clearance surface 420 of the raker tooth 442 defines a primary clearance angle 422 of about 40°. As also shown in FIG. 11, the raker tooth 442 defines a first gullet radius R1 and a second gullet radius R2 radius that are substantially the same size. The first gullet radius R1 and the second gullet radius R2 of the raker tooth 442 are also substantially the same size as the first gullet radius R1 of the short teeth 440, 440, i.e., about 0.045 inch. As shown in FIGS. 10-12, the intersection of the clearance surface 420 of the raker tooth 442 and a side edge 452 of the blade 410 forms a point or tip 450 that defines the respective end of the blade 410. The blade tip 450 assists the cut when moving in the reverse cutting direction "y" of the blade, whereas the tip of the raker tooth 442 pierces the workpiece in the plunge cutting direction of the blade, which is substantially normal to the cutting direction "x" and reverse cutting direction "y" of the blade.

The recip blade 410 is particularly advantageous for plunge cutting. The tip of the raker tooth 442 can be plunged into a work piece to puncture the work piece and create an initial entry point for the blade. After a work piece is punctured by the tip of the raker tooth 442, the blade 410 can be further plunged into the work piece. The raker tooth 442 is a relatively tall and strong tooth, and therefore creates a pathway within the work piece for the trailing teeth to enter the work piece. As a result, the raker tooth 442 and the short teeth 440 act to protect the first and second set teeth 416, 418, respectively, during a plunge into a work piece. One advantage of the short teeth 440, 440 is that they tend stabilize the blade 410 and prevent the blade from veering during plunging. Further, the unset raker 442 tooth, the first unset tooth 416A/B, and the second unset tooth 416B/C, centralize the cutting forces on the blade 410 and thereby substantially prevent the blade from bending or twisting as it is plunged into, and reciprocated through, a work piece. Centralizing the cutting forces on the blade 410 to prevent the blade 410 from bending and/or twisting is especially advantageous because it allows the blade 410 to be relatively long (e.g., at least about 6 inches), which is required for typical plunge cutting operations.

In an alternative embodiment of the recip blades, rather than forming one or more relatively short tooth located between the unset tip tooth and the repeating pattern of two consecutive teeth, the recip blade can include one or more additional unset teeth located between the unset tip tooth and the repeating pattern of two consecutive teeth. One such embodiment includes two additional unset teeth located between the unset tip tooth and the repeating pattern of consecutive teeth. In one such embodiment, the additional unset teeth are about the same height as the unset tip tooth. In another embodiment, the additional unset teeth are shorter than the unset tip tooth as described above.

Another advantage of the saw blades of the present invention is that they can provide significantly improved performance in comparison to prior art saw blades, including improved blade life. As summarized in the table below, recip saw blades embodying the invention were tested against a prior art blade. The blade embodying the invention was the same the blade described above in connection with FIGS. 2-4, and the prior blade is sold by the assignee of the present invention under model no. 656R. Both blade types were used to cut the same material (1 inch diameter black pipe), at a recip saw speed of about 1000 strokes per minute ("SPM"), under a blade down force of about 25 lbs. Each blade was deemed to have reached its failure mode after either (i) three consecutive cuts averaging 90 seconds, or (ii) one cut above 120 seconds. The following test data was generated:

| Test No. | Recip Blade of Invention | Prior Art Recip Blade |
|---|---|---|
| 1 | 243 | 62 |
| 2 | 152 | 85 |
| 3 | 158 | 50 |
| 4 | 209 | 52 |
| 5 | 136 | 56 |
| Average Results: | 179.6 | 61.0 |

As can be seen, the blades embodying the present invention unexpectedly provide substantially improved blade life (almost three times) in comparison to a comparable prior art blade. Another advantage of the blades of the present invention is that the relatively shallow secondary clearance angle defines a robust tooth form that provides significantly improved resistance to premature tooth facture in abusive cutting applications in comparison to the prior art. Yet another advantage of the saw blades of the present invention is that if the tip of a tooth does fracture, the relatively shallow secondary clearance surface of the same tooth likely will not fracture to thereby permit continued usage of the blade.

The recip blades of the present invention may incorporate the features of the recip blades of U.S. patent application Ser. No. 11/963,474, filed Dec. 21, 2007, entitled "Reciprocating Saw Blade Having Variable-Height Teeth and Related Method", which is assigned to the assignee of the present invention and is hereby expressly incorporated by reference as part of the present disclosure.

The term "recip" or "recip blade(s)" is used herein to mean any saw blade that is designed to cut when driven in a reciprocating motion by a power tool (e.g., in an orbital, linear and/or angled cutting action), including without limitation power tools that are known generally as "reciprocating saws," such as the Sawzall™ sold by Milwaukee Electric Tool Corp and the Tiger Saw™ sold by Porter-Cable Corporation, as well as blades utilized in jig saw machines, blades used in air saw machines, and blades used in portable power hack machines.

As may be recognized by those of ordinary skill in the pertinent art based on the teachings herein, numerous changes and modifications may be made to the above-described and other embodiments of the present invention without departing from the scope of the invention as defined in the appended claims. For example, the tooth forms may differ from the tooth forms described herein, certain tooth forms may be removed, other different tooth forms may be added, and/or the teeth of the repeating pattern my all define the same tooth form. Similarly, the blades may define different pitches, different set patterns, and different combinations of set patterns and tooth heights than described herein. For example, the teeth need not define any height differentials and/or the teeth may define varying degrees of set magnitude (including heavy and light sets as illustrated herein, and other degrees of set). As another example, any other clearance angles, tooth heights, gullet radii and rake face depths that are known, or that later become known, and different than those described herein equally may be employed. In addition, although the saw blades described herein are recip blades, the invention may find applicability to other types of saw blades that are currently known, or that later become known, such as hole saws or hole cutters. As another example, the blade may include the features described above, but such features may be dimensioned smaller or larger than the dimensions disclosed herein. Accordingly, this detailed description of the currently preferred embodiments is to be taken in an illustrative, as opposed to a limiting sense.

What is claimed is:

1. A recip blade comprising a recip blade body and a cutting edge extending along the recip blade body, wherein the cutting edge comprises a plurality of teeth defining a repeating pattern comprising groups of two consecutive teeth, wherein each group comprises a first tooth and a second tooth, wherein the first tooth and the second tooth each comprise a tip, a rake face located on one side of the tip, a primary clearance surface located adjacent to the tip on an opposite side of the tip relative to the rake face and defining a primary clearance angle, a secondary clearance surface located adjacent to the primary clearance surface on the opposite side of the tip relative to the rake face and defining a secondary clearance angle, and a gullet, wherein the secondary clearance angle of the first tooth is shallower than the primary clearance angle of the first tooth, wherein the secondary clearance angle of the second tooth is shallower than the primary clearance angle of the second tooth, wherein the primary clearance angle of the second tooth is steeper than the primary clearance angle of the first tooth, and wherein the secondary clearance angle of the second tooth is shallower than the secondary clearance angle of the first tooth.

2. A recip blade as defined in claim 1, wherein the primary clearance angle of the first tooth and the primary clearance angle of the second tooth each are within the range of 17° to 45°, and wherein the secondary clearance angle of the first tooth and the secondary clearance angle of the second tooth each are within the range of 15° to 25°.

3. A recip blade as defined in claim 1, wherein the first tooth and the second tooth each further comprise a first gullet radius located on an opposite side of the gullet relative to the rake face, and a second gullet radius located on a same side of the gullet as the rake face, and wherein the gullet defines a depth that is greater than the second gullet radius.

4. A recip blade as defined in claim 3, wherein the second gullet radius is greater than the first gullet radius.

5. A recip blade as defined in claim 1, wherein the rake face defines a depth that is within the range of 20% to 60% of the depth of the preceding gullet.

6. A recip blade as defined in claim 5, wherein the depth of the rake face is within the range of 30% to 50% of the depth of the preceding gullet.

7. A recip blade as defined in claim 1, wherein the primary clearance surface of the second tooth defines a depth that is within the range of 10% to 45% of the depth of the succeeding gullet.

8. A recip blade as defined in claim 7, wherein the depth of the primary clearance surface of the second tooth is within the range of 15% to 40% of the depth of the succeeding gullet.

9. A recip blade as defined in claim 1, wherein the two consecutive teeth define a pitch equal to 14 pitch or coarser than 14 pitch.

10. A recip blade as defined in claim 1, wherein the second tooth defines a lower height than the first tooth prior to any setting of the first tooth and the second tooth.

11. A recip blade as defined in claim 10, wherein a difference in height between the first tooth and the second tooth prior to tooth set is within the range of 0.002 inch to 0.010 inch.

12. A recip blade as defined in claim 1, wherein the plurality of teeth define a tooth set pattern comprising at least one first set tooth set to a first set direction and at least one second set tooth set to a second set direction opposite the first set direction.

13. A recip blade as defined in claim 12, wherein the tooth set pattern comprises at least one light first set tooth set to a light first set magnitude, at least one heavy first set tooth set to a heavy first set magnitude, at least one light second set tooth set to a light second set magnitude, and at least one heavy second set tooth set to a heavy second set magnitude, wherein the light first set magnitude and the light second set magnitude are defined by relatively lighter tooth sets as compared to the heavy first set magnitude and the heavy second set magnitude, respectively.

14. A recip blade as defined in claim 13, wherein the tooth set pattern comprises a leading light first set tooth, a heavy first set tooth trailing the leading light first set tooth, a light second set tooth trailing the heavy first set tooth, and a heavy second set tooth trailing the light second set tooth.

15. A recip blade as defined in claim 14, wherein the tips of the heavy set teeth are lower than the tips of the light set teeth.

16. A recip blade as defined in claim 13, wherein the tooth set pattern comprises at least one unset tooth.

17. A recip blade as defined in claim 13, wherein the tooth set pattern comprises a leading light first set tooth, a heavy first set tooth trailing the leading light first set tooth, a pair of consecutive unset teeth trailing the heavy first set tooth, a light second set tooth trailing the pair of consecutive unset teeth, and a heavy second set tooth trailing the light second set tooth.

18. A recip blade as defined in claim 17, wherein the tips of the heavy set teeth are lower than the tips of the light set teeth.

19. A recip blade as defined in claim 13, wherein the tooth set pattern comprises at least one leading unset tooth and at least one trailing set tooth with respect to a cutting direction of the recip blade, and wherein the at least one trailing set tooth comprises a first set tooth set to a first direction and a second set tooth set to a second direction opposite the first direction.

20. A recip blade as defined in claim 19, wherein the tooth set pattern comprises a leading first unset tooth, a first set tooth trailing the leading first unset tooth, a second unset tooth trailing the first set tooth, and a second set tooth trailing the second unset tooth.

21. A recip blade as defined in claim 20, wherein the tips of the unset teeth are higher than the tips of a plurality of the set teeth.

22. A recip blade as defined in claim 12, wherein the tooth set pattern comprises a first pair of consecutive leading teeth set in a first direction, and a second pair of consecutive trailing teeth set in a second direction opposite the first direction.

23. A recip blade as defined in claim 22, wherein the first pair of consecutive leading teeth comprises a first light set tooth followed by a first heavy set tooth, wherein the first light set tooth is set to a relatively light tooth set as compared to the first heavy set tooth, wherein the second pair of consecutive trailing teeth comprises a second light set tooth followed by a second heavy set tooth, and wherein the second light set tooth is set to a relatively light tooth set as compared to the second heavy set tooth.

24. A recip blade as defined in claim 23, wherein the tooth set pattern comprises a pair of consecutive unset teeth located between the first pair of consecutive leading teeth and the second pair of consecutive trailing teeth.

25. A recip blade as defined in claim 24, wherein the tip of each of the leading teeth is higher than the tip of each of the trailing teeth.

26. A recip blade as defined in claim 1, wherein the repeating pattern is defined by the groups of two consecutive teeth without any other teeth located therebetween.

27. A recip blade as defined in claim 1, wherein the first tooth and the second tooth each further comprise a tertiary clearance surface located adjacent to the secondary clearance surface and defining a tertiary clearance angle, wherein the tertiary clearance angle of the first tooth is steeper than the secondary clearance angle of the first tooth, and wherein the tertiary clearance angle of the second tooth is steeper than the secondary clearance angle of the second tooth.

28. A recip blade as defined in claim 27, wherein the tertiary clearance angle of the first tooth is steeper than the primary clearance angle of the first tooth, and wherein the tertiary clearance angle of the second tooth is steeper than the primary clearance angle of the second tooth.

29. A recip blade as defined in claim 1, further comprising a tang located at one end of the recip blade and a blade tip located at an opposite end of the recip blade relative to the tang, and wherein the cutting edge further comprises an unset tip tooth located at the blade tip and defining a clearance surface at least partially forming the blade tip, and at least one of (i) at least one short tooth located between the unset tip tooth and the plurality of teeth that is relatively short as compared to at least one of the unset tip tooth and the plurality of teeth, and (ii) at least one additional unset tooth located between the unset tip tooth and the other teeth.

30. A recip blade as defined in claim 29, wherein the at least one short tooth comprises two consecutive short teeth.

31. A recip blade as defined in claim 30, wherein each of the two consecutive short teeth is either unset or defines a light set.

32. A recip blade as defined in claim 29, wherein the at least one short tooth is 30% to 90% shorter than the unset tip tooth.

33. A recip blade comprising a recip blade body and a cutting edge extending along the recip blade body, wherein the cutting edge comprises a plurality of teeth defining a repeating pattern comprising groups of two consecutive teeth, wherein each group comprises a first tooth and a second tooth, wherein the first tooth and the second tooth each comprise a tip, a rake face located on one side of the tip, a first means for imparting cutting speed to the tooth located adjacent to the tip on an opposite side of the tip relative to the rake face and defining a primary clearance angle, a second means for imparting toughness to the tooth located adjacent to the first means on the opposite side of the tip relative to the rake face and defining a secondary clearance angle, and a gullet, wherein the secondary clearance angle of the first tooth is shallower than the primary clearance angle of the first tooth, wherein the secondary clearance angle of the second tooth is shallower than the primary clearance angle of the second tooth, wherein the primary clearance angle of the second tooth is steeper than the primary clearance angle of the first tooth, and wherein the secondary clearance angle of the second tooth is shallower than the secondary clearance angle of the first tooth.

34. A recip blade as defined in claim 33, wherein the first tooth and the second tooth each further comprise a first gullet radius located on an opposite side of the gullet relative to the rake face, and a second gullet radius located on a same side of the gullet as the rake face, and wherein the second gullet radius is less than a depth of the gullet.

35. A recip blade as defined in claim 33, wherein the primary clearance angle of the first tooth and the primary clearance angle of the second tooth each are within the range of 25° to 45°, and wherein the secondary clearance angle of the first tooth and the secondary clearance angle of the second tooth each are within the range of 15° to 25°.

36. A recip blade as defined in claim 33, wherein the repeating pattern is defined by the groups of two consecutive teeth without any other teeth located therebetween, and wherein the tip of the second tooth is lower than the tip of the first tooth.

37. A recip blade as defined in claim 33, wherein the first means is a primary clearance surface, and wherein the second means is a secondary clearance surface.

38. A recip blade comprising a recip blade body and a linear cutting edge extending along the recip blade body, wherein the linear cutting edge comprises a plurality of teeth defining a repeating pattern comprising groups of two consecutive teeth without any other teeth located therebetween, wherein each group comprises a first tooth and a second tooth, wherein the first tooth and the second tooth each comprise a tip, a rake face located on one side of the tip, a primary clearance surface located adjacent to the tip on an opposite side of the tip relative to the rake face and defining a primary clearance angle, a secondary clearance surface located adjacent to the primary clearance surface on the opposite side of the tip relative to the rake face and defining a secondary clearance angle, and a gullet, wherein the secondary clearance angle of the first tooth is shallower than the primary clearance angle of the first tooth, wherein the secondary clearance angle of the second tooth is shallower than the primary clearance angle of the second tooth, wherein the primary clearance angle of the second tooth is steeper than the primary clearance angle of the first tooth, and wherein the secondary clearance angle of the second tooth is shallower than the secondary clearance angle of the first tooth.

39. A recip blade as defined in claim 38, wherein the first tooth and the second tooth each further comprise a first gullet radius located on an opposite side of the gullet relative to the rake face, and a second gullet radius located on a same side of the gullet as the rake face, and wherein the gullet defines a depth that is greater than the second gullet radius.

40. A recip blade as defined in claim 38, wherein the tip of the second tooth is lower than the tip of the first tooth.

41. A recip blade as defined in claim 1, wherein the primary clearance surface of the first tooth defines a depth that is within the range of 10% to 45% of the depth of the succeeding gullet.

42. A recip blade as defined in claim 41, wherein the depth of the primary clearance surface of the first tooth is within the range of 15% to 40% of the depth of the succeeding gullet.

* * * * *